United States Patent
Ringholz

(10) Patent No.: US 7,389,584 B2
(45) Date of Patent: Jun. 24, 2008

(54) HEAT EXCHANGER FOR A MOTOR VEHICLE AND A METHOD FOR MANUFACTURING SAME

(75) Inventor: Thomas Ringholz, Mittenwald (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/583,025

(22) Filed: Oct. 19, 2006

(65) Prior Publication Data

US 2007/0034365 A1 Feb. 15, 2007

Related U.S. Application Data

(63) Continuation of application No. PCT/EP2005/003351, filed on Mar. 31, 2005.

(30) Foreign Application Priority Data

Apr. 23, 2004 (DE) .................. 10 2004 019 769

(51) Int. Cl.
B21D 53/02 (2006.01)
F28F 9/02 (2006.01)

(52) U.S. Cl. .............. 29/890.03; 29/890.052; 165/41; 165/44; 165/173; 180/229

(58) Field of Classification Search .............. 165/173, 165/41, 44; 180/68.4, 229; 29/890.03, 890.052
See application file for complete search history.

(56) References Cited

U.S. PATENT DOCUMENTS 5,645,125 A 7/1997 Kroetsch et al.
6,082,439 A * 7/2000 Kato et al. .................. 165/173
6,904,965 B2 6/2005 Beck et al.
7,055,487 B2 * 6/2006 Kawakubo et al. ...... 123/196 A
2004/0238652 A1 * 12/2004 Takei et al. ................ 236/34.5

FOREIGN PATENT DOCUMENTS

| DE | 197 19 255 A1 | 11/1998 |
|----|---------------|---------|
| DE | 198 57 508 A1 | 7/1999 |
| DE | 198 30 846 A1 | 1/2000 |
| DE | 203 03 139 U1 | 7/2003 |
| DE | 102 42 311 A1 | 3/2004 |
| EP | 1 445 435 A1 | 8/2004 |
| FR | 2 833 920 A1 | 6/2003 |
| JP | 1-148681 A | 6/1989 |

(Continued)

OTHER PUBLICATIONS

Honda Motors Europe (North) GmbH, *Fireblade—Geballte Rennsportkompetenz*, Feb. 2004, 12 pp.

(Continued)

Primary Examiner—Leonard R Leo
(74) Attorney, Agent, or Firm—Crowell & Moring LLP

(57) ABSTRACT

A heat exchanger for a motor vehicle, particularly a motorcycle in which a bent cooling element is disposed between a first and second collector tank. The bent cooling element is provided with a longer and a shorter side as well as lateral connecting planes for joining the cooling element to the collector tanks. The collector tanks are made of a material that has substantially lower strength than the material of the cooling element.

24 Claims, 4 Drawing Sheets

FOREIGN PATENT DOCUMENTS

| | | | |
|---|---|---|---|
| JP | 2-190223 A | 7/1990 |
| JP | 2-205251 A | 8/1990 |
| JP | 3-246185 A | 11/1991 |

OTHER PUBLICATIONS

Kern, *Neue Konstruktiongeloeteter Ganz-Aluminium-Kuehler fuer Kfz*, ATZ Automobiltechnische Zeitschrift, Franckh., Stuttgart, Germany, Bd. 100, Nr. 9, Sep. 1998, pp. 670-673.

International Search Report dated Jul. 4, 2005 including English translation of relevant portion and PCT/ISA/237 (Sixteen (16) pages).

German Search Report dated Sep. 28, 2004 including English translation of relevant portion (Eight (8) pages).

\* cited by examiner

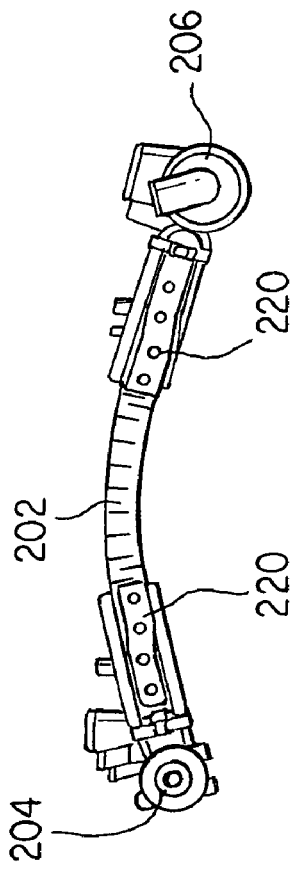
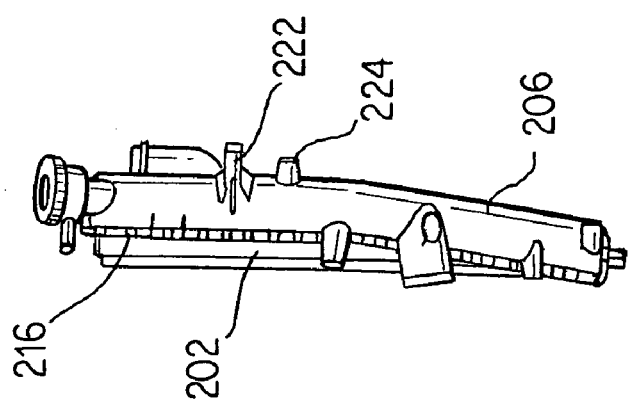
Fig. 2c
FIG. 2b

HEAT EXCHANGER FOR A MOTOR VEHICLE AND A METHOD FOR MANUFACTURING SAME

This application is a Continuation of PCT/EP2005/003351, filed Mar. 31, 2005, and claims the priority of DE 10 2004 019 769.5, filed Apr. 23, 2004, the disclosures of which are expressly incorporated by reference herein.

BACKGROUND AND SUMMARY OF THE INVENTION

The invention relates to a heat exchanger for a motor vehicle, in particular for a motorcycle, having a first and a second collecting tank and a curved heat sink arranged between the collecting tanks, so that flow can pass through it, also having lateral connecting planes for attachment to the collecting tanks and having a longer side and a shorter side between the collecting tanks.

Cooling of efficient internal combustion engines in motor vehicles is usually accomplished by using a coolant which absorbs heat in areas of the internal combustion engine that are to be cooled and releases this heat elsewhere via a heat exchanger through which air can flow. The evolution of heat and thus the requirement for dissipation of heat via the heat exchanger depend on the power of the internal combustion engine. Very powerful internal combustion engines require especially effective heat exchangers having the largest possible surface area exposed to oncoming flow.

Especially in the motorcycle area, however, the available surface area is limited. With very powerful internal combustion engines, in particular and/or when very little space is available because of design factors, very complex measures must sometimes be taken to ensure an adequate cooling capacity.

An efficient heat exchanger for a motorcycle is known from the Honda company Fireblade brochure of Feb., 2004; in the installed position, this heat exchanger has an oncoming flow surface that is inclined at the side and bent about the vertical axis. The known heat exchanger having lateral collecting tanks comprises a heat sink through which coolant can flow transversely and which has a longer side at the top and a shorter side at the bottom between the collecting tanks and is formed from a plurality of individual cross tubes. The heat sink as well as the collecting tanks that are fixedly attached to the heat sink with the known heat exchanger are made of metal with the individual components being welded together.

The curved heat sink of the heat exchanger has a smaller bending radius on its upper longer side than the lower shorter side, with the result that the lateral collecting tanks experience torsion, which leads to stresses. These stresses are dissipated via areas of lower strength, often over a very long period of time.

The invention is based on the object of further improving upon a heat exchanger as defined in the introduction and especially facilitating the dissipation of stresses in the case of twisted collecting tanks. Furthermore, an especially economical method of manufacturing such a heat exchanger is to be made available.

This object is achieved with a heat exchanger, whereby according to the basic idea, the collecting tanks are made of a material having much lower strength values than the material of the heat sink.

It is especially preferable if the material of the heat sink has at least 1.5 times, especially approximately 2.5 to 20 times the strength of the material of the collecting tanks. The heat sink is expediently made of metal and the collecting tanks are made of plastic. It is possible for the heat sink to be made of a lightweight metal or a lightweight metal alloy such as an aluminum alloy and for the collecting tanks to be made of a thermoplastic material such as polyamide.

According to a very advantageous exemplary embodiment, the heat sink in the installed position has an oncoming flow surface at the bottom that is chamfered or rounded at the side and has flangeable straps on its lateral connecting planes for attachment to the collecting tanks, these straps being tightly attached to the heat sink with the inclusion of a gasket.

It has proven advantageous for one of the collecting tanks for holding a thermostatic valve that controls the heat exchanger flow as a function of temperature to be integrally connected to a housing. It is likewise regarded as expedient if the collecting tanks are provided with fastening points for mounting on the vehicle and/or attaching other elements.

An especially preferred method for manufacturing such a heat exchanger is characterized in that the collecting tanks are connected to the planar heat sink on its lateral connecting planes and bending of the heat sink is performed subsequently; after this bending, the longer side of the heat sink has a smaller bending radius than the shorter side, so that with the bending of the heat sink, the collecting tanks connected to its lateral connecting planes are twisted.

The stresses that occur in bending the heat sink and the associated twisting of the collecting tanks are advantageously absorbed essentially by the collecting tanks and can be dissipated into the collecting tanks due to the material.

It is highly expedient if the dissipation of stresses into the collecting tanks is supported by means of heat and/or substances that reduce the strength of the material of the collecting tanks.

BRIEF DESCRIPTION OF THE DRAWINGS

The invention is explained in greater detail below on the basis of an exemplary embodiment with reference to the figures which show schematic diagrams as examples.

FIG. 2b shows a heat exchanger for a motorcycle of FIG. 2a having a curved heat sink arranged between two collecting tanks in a side view.

FIG. 2c shows a heat exchanger for a motorcycle of FIG. 2a having a curved heat sink arranged between two collecting tanks as seen from above.

DETAILED DESCRIPTION

Figure 1:
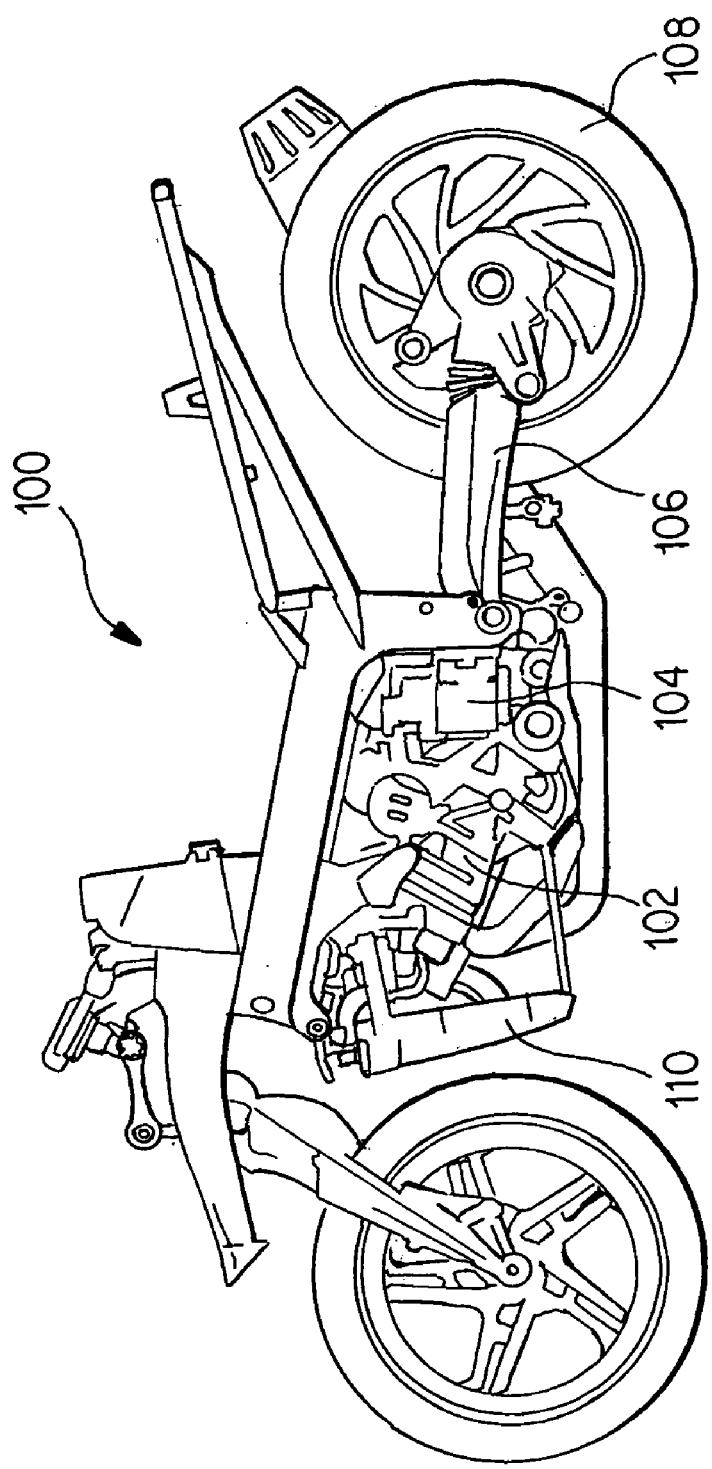
FIG. 1 shows a motorcycle having a heat exchanger.

FIG. 1 shows a motorcycle 100. A reciprocating piston internal combustion engine 102 is provided to drive the motorcycle 100, transmitting the driving forces via a cardan shaft 106, for example, a driving belt or a drive chain to the driven wheel 108 with a transmission 104 in between. The cooling of the internal combustion engine 102 is accomplished by means of a circulating coolant which absorbs heat in areas of the internal combustion engine that are to be cooled and releases this heat elsewhere via a heat exchanger 110 through which air can flow.

Figure 2A:
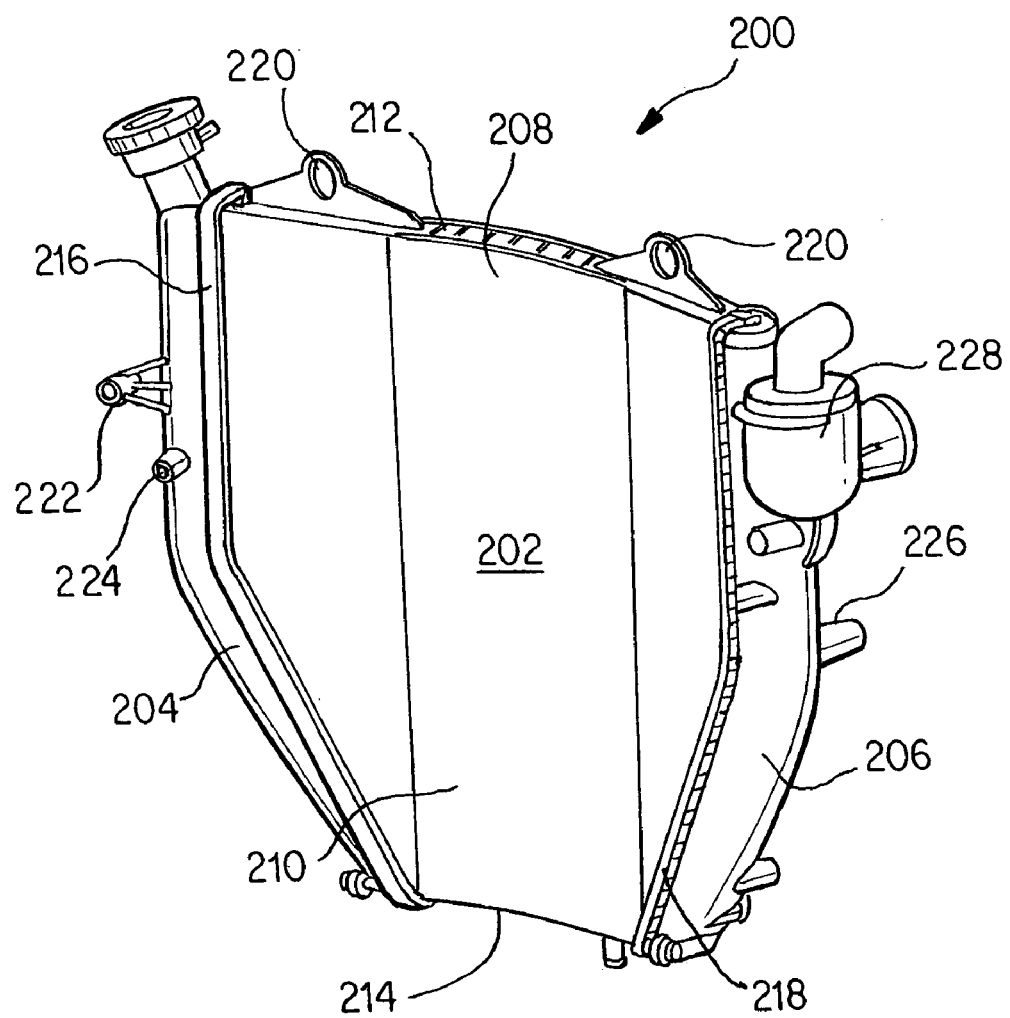
FIG. 2a shows a heat exchanger for a motorcycle in accordance with an embodiment of the present invention having a curved heat sink arranged between two collecting tanks in an isometric view.

A heat exchanger 200 for cooling the internal combustion engine of a motorcycle, having a collecting tank 204 on the radiator forward flow end and a collecting tank 206 on the radiator return flow end with a curved heat sink 202 arranged between them, as shown in an ISO view in FIG. 2a; FIG. 2b shows a side view of the collecting tank 204 on the radiator forward flow end and FIG. 2c shows the curved heat exchanger 200 as seen from above.

In the installed position, the heat sink 202 has a laterally inclined oncoming flow surface at the bottom in the installed position. In the present case, the oncoming flow surface of the heat sink 202 is formed geometrically by an upper rectangular area 208 and a lower trapezoidal area 210, but it may also be expedient if the heat sink 202 has a different surface, e.g., a V-shaped surface adapted to the available space. It shall be emphasized that the heat sink 202 has a longer side 212 and a shorter side 214 between the collecting tanks 204, 206.

The heat sink 202 has a plurality of cross tubes through which flow passes from the collecting tank 204 on the radiator forward flow end to the collecting tank 206 on the radiator return flow end, these cross tubes each being fixedly connected with lateral connecting planes 216, 218 for connecting to the collecting tanks 204, 206. The cross tubes and the lateral connecting planes 216, 218 are made of metal, in particular lightweight metal or a lightweight metal alloy such as aluminum, and are soldered, welded or glued together.

For connecting the collecting tanks 204, 206 to the lateral connecting planes 216, 218, the connecting planes 216, 218 have straps that can be flanged on the peripheral edges and engage behind a peripheral edge of the collecting tanks 204, 206 in the installed state. Gaskets (not visible here) are provided for a tight connection of the collecting tanks 204, 206 to the lateral connecting planes 216, 218. The collecting tanks 204, 206 are made of a thermoplastic material such as fiberglass-reinforced nylon, e.g., nylon 6.6 containing 30% glass fibers. A housing 228 to hold a thermostatic valve that controls the flow through the heat exchanger as a function of temperature is integrally connected to the collecting tank 206 on the return flow end of the radiator.

Figure 3:
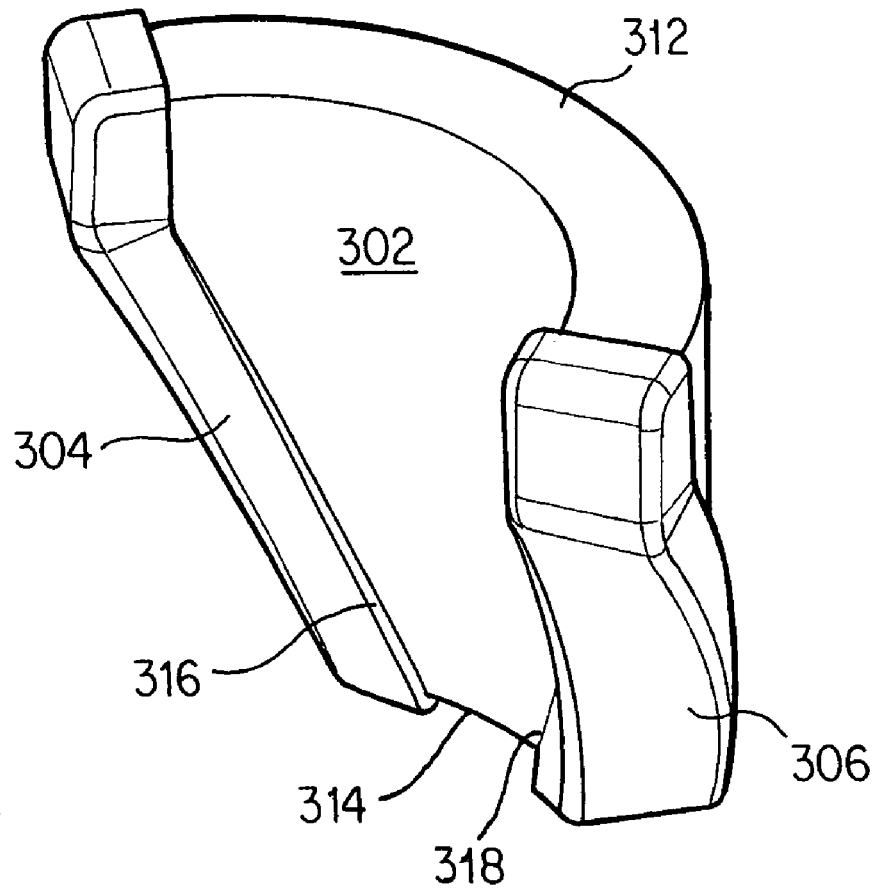
FIG. 3 shows a heat exchanger for a motorcycle in accordance with another embodiment of the present invention having a curved heat sink arranged between two collecting tanks with the connecting plane of the collecting tanks twisted.

Fabrication of the heat exchanger 200 begins with a flat, uncurved heat sink 202 having lateral connecting planes 216, 218. The collecting tanks 204, 206 are mounted with a gasket and secured by flanging the straps. The heat sink 202, 302 is subsequently bent, as illustrated on an exaggerated scale in FIG. 3, whereby the longer side 212, 312 undergoes a greater bending than the shorter side 214, 314 owing to the difference in bending resistance torques, with the result that the collecting tanks 204, 206, 304, 306 together with the connecting planes 216, 218, 316, 318 are twisted.

The collecting tanks 204, 206, 304, 306, which are made of plastic, have lower strength values in comparison with the metallic material of the heat sink 202, 302 and the connecting planes 216, 218, 316, 318 and accordingly they absorb a significant portion of the stresses occurring in deformation, so that the area of the connection of the individual radiator cross tubes with the connecting planes 216, 218, 316, 318 is relieved in particular. The plastic of the collecting tanks 204, 206, 304, 306 in the present case has a strength value $R_m$ of 30 to 80 N/mm², while the cooling bodies 202, 302 and the connecting planes 216, 218, 316, 318 made of an aluminum alloy have a strength value $R_m$ of 200 to 600 N/mm², so the material of the heat sink 202, 302 and the connecting planes 216, 218, 316, 318 is 2.5 to 20 times stronger than the material of the collecting tanks 204, 206, 304, 306.

The stresses occurring in deformation of the heat sink 202, 302, the connecting planes 216, 218, 316, 318 and the collecting tanks 204, 206, 304, 306 are dissipated, in particular in the collecting tanks due to the material by yielding of the material. The dissipation of stress in the collecting tanks is supported by heat and/or substances that reduce the strength of the material of the collecting tanks; for example the coolant of the internal combustion engine has a strength-reducing effect as a function of operating temperature and/or due to the glycol contained therein. In the present case, the strength of the material of the collecting tanks 204, 206, 304, 306 is reduced by 30 to 40%. The dissipation of internal stresses is accomplished comparatively rapidly and has a very positive effect on the long-term functionality of the heat exchanger and rejects in production can be reduced.

The collecting tanks 204, 206 are equipped with fastening points for securing them on the motor vehicle 220 and/or for attaching additional elements 222, 224, 226 such as fans, paneling parts, air ducts and/or protective grids. In the production of the collecting tanks 204, 206, the torsion-induced displacement in the assembly state is performed so that all the fastenings and connection points assume their intended positions after the deformation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat exchanger for a motor vehicle through which the coolant flows, comprising:
    a first collecting tank;
    a second collecting tank; and
    a heat sink
    wherein
        the heat sink is arranged between the first and second collecting tanks, has lateral connecting planes for connecting to the collecting tanks, has a longer side and a shorter side between the collecting tanks, and is bent, and
        the collecting tanks are made of a material having lower strength than the material of the heat sink, such that when the heat sink is bent the collecting tanks are twisted to conform to the shape of the heat sink between the longer side and the shorter side of the heat sink.

2. The heat exchanger as claimed in claim 1, wherein the material of the heat sink has a strength which is at least 1.5 times greater than that of the material of the collecting tanks.

3. The heat exchanger as claimed in claim 1, wherein the material of the heat sink has a strength which is approximately 2.5 to 20 times greater than that of the material of the collecting tanks.

4. The heat exchanger as claimed in claim 1, wherein the heat sink is made of metal.

5. The heat exchanger as claimed in claim 2, wherein the heat sink is made of metal.

6. The heat exchanger as claimed in claim 3, wherein the heat sink is made of metal.

7. The heat exchanger as claimed in claim 4, wherein the heat sink is made of a lightweight metal or a lightweight metal alloy.

8. The heat exchanger as claimed in claim 7, wherein the heat sink is made of aluminum or aluminum alloy.

9. The heat exchanger as claimed in claim 1, wherein the heat sink has an oncoming flow surface at a bottom region that is beveled at a side which is a lateral side when the heat exchanger is in an installed position.

10. The heat exchanger as claimed in claim 1, wherein the collecting tanks are made of plastic.

11. The heat exchanger as claimed in claim 10, wherein the heat sink is made of metal.

12. The heat exchanger as claimed in claim 2, wherein the collecting tanks are made of plastic.

13. The heat exchanger as claimed in claim 12, wherein the heat sink is made of metal.

14. The heat exchanger as claimed in claim 3, wherein the collecting tanks are made of plastic.

15. The heat exchanger as claimed in claim 14, wherein the heat sink is made of metal.

16. The heat exchanger as claimed in claim 1, wherein the heat sink has flangeable straps on lateral connecting planes for connecting to the collecting tanks.

17. The heat exchanger as claimed in claim 16, wherein the collecting tanks are sealing connected to the heat sink with the inclusion of a gasket between each of the collecting tanks and the heat sink.

18. The heat exchanger as claimed in claim 1, wherein a housing is integrally connected to one of the collecting tanks to hold a thermostatic valve which controls the flow through the heat exchanger as a function of temperature.

19. The heat exchanger as claimed in claim 1, wherein the collecting tanks have fastening points for at least one of mounting on the vehicle and attaching other elements.

20. A method for manufacturing a heat exchanger, comprising the acts of:
    connecting a first collecting tank and a second collecting tank to a planar heat sink at lateral connecting planes of the heat sink, said heat sink being arranged between the first and second collecting tanks and having a longer side and a shorter side; and
    bending the heat sink after connection of the collecting tanks,
    wherein the collecting tanks are made of a material having lower strength than the material of the heat sink, such that when the heat sink is bent the collecting tanks twist to conform to the shape of the heat sink between the longer side and the shorter side of the heat sink.

21. The method as claimed in claim 20, wherein the longer side of the heat sink has a shorter bending radius after being bent than does the shorter side.

22. The method as claimed in claim 21, wherein the collecting tanks undergo torsion as the heat sink is bent.

23. The method as claimed in claim 21, wherein stresses occurring during bending of the heat sink are essentially absorbed by the collecting tanks.

24. The method as claimed in claim 23, wherein the stresses absorbed in the collecting tanks are reduced by exposure to at least one of heat and substances that reduce the strength of the material of the collecting tanks.

\* \* \* \* \*